(12) United States Patent
Zhu et al.

(10) Patent No.: US 12,487,713 B2
(45) Date of Patent: Dec. 2, 2025

(54) TOUCH DISPLAY DEVICES AND TOUCH METHODS THEREOF

(71) Applicant: Wuhan China Star Optoelectronics Technology Co., Ltd., Hubei (CN)

(72) Inventors: Weiwu Zhu, Hubei (CN); Gonghua Zou, Hubei (CN); Ting Ye, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 18/687,839

(22) PCT Filed: Jan. 9, 2024

(86) PCT No.: PCT/CN2024/071251
§ 371 (c)(1),
(2) Date: Feb. 29, 2024

(87) PCT Pub. No.: WO2025/138335
PCT Pub. Date: Mar. 7, 2025

(65) Prior Publication Data
US 2025/0244850 A1    Jul. 31, 2025

(30) Foreign Application Priority Data

Dec. 29, 2023  (CN) .......................... 202311870018.2

(51) Int. Cl.
G06F 3/044 (2006.01)
G02F 1/1333 (2006.01)
G02F 1/1335 (2006.01)

(52) U.S. Cl.
CPC ........ *G06F 3/0442* (2019.05); *G02F 1/13338* (2013.01); *G02F 1/133512* (2013.01); *G02F 1/133514* (2013.01); *G06F 3/0448* (2019.05)

(58) Field of Classification Search
CPC .... G06F 3/0442; G06F 3/0448; G06F 3/0412; G02F 1/13338; G02F 1/133512; G02F 1/133514
See application file for complete search history.

(56) References Cited

U.S. PATENT DOCUMENTS

2016/0195981 A1    7/2016  Shin
2018/0284915 A1   10/2018  Kim
(Continued)

FOREIGN PATENT DOCUMENTS

CN     106125975    11/2016
CN     107145266     9/2017
(Continued)

OTHER PUBLICATIONS

International Search Report and the Written Opinion Dated Mar. 22, 2024 From the International Searching Authority Re. Application No. PCT/CN2024/071251 and its Translation into English. (19 Pages).

*Primary Examiner* — Abdul-Samad A Adediran

(57) ABSTRACT

Disclosed are a touch display device and a touch method thereof. The touch display device is added with a pattern layer having a plurality of minimum units. Multiple minimum units of the plurality of minimum units are disposed correspondingly on one touch electrode. The feature bodies of the pattern layer are configured to be identified by an active pen disposed externally, the first pattern has a position information, so that a first coordinate information of a touch point of the active pen is obtained by the active pen disposed externally, and the first coordinate information is used to correct a second coordinate information.

20 Claims, 4 Drawing Sheets

(56) References Cited

U.S. PATENT DOCUMENTS

2019/0018271 A1* 1/2019 Xie .................. G06F 3/0412
2023/0251728 A1 8/2023 Lee

FOREIGN PATENT DOCUMENTS

KR 10-1103789 1/2012
KR 10-2020-0082364 7/2020

* cited by examiner

TOUCH DISPLAY DEVICES AND TOUCH METHODS THEREOF

RELATED APPLICATIONS

This application is a National Phase of PCT Patent Application No. PCT/CN2024/071251 having International filing date of Jan. 9, 2024, which claims the benefit of priority of China Patent Application No. 202311870018.2 filed on Dec. 29, 2023. The contents of the above applications are all incorporated by reference as if fully set forth herein in their entirety.

TECHNICAL FIELD

The present disclosure relates to display technologies, and in particular, to touch display devices and touch methods thereof.

BACKGROUND

An active pen is a display input device widely used in recent years. In order to ensure the accuracy of the active pen, it is generally required that a touch chip has enough touch channels and touch electrodes of a panel are made smaller. As the panel size becomes larger and larger, the number of touch channels in a driving chip is insufficient, resulting in poor touch accuracy of the active pen.

Technical Problem

Embodiments of the present disclosure provide a touch display device and a touch method thereof, which can improve the touch accuracy of an active pen.

Technical Solutions

In one aspect, an embodiment of the present disclosure provides a touch display device including an active pen and a touch screen, the touch screen includes:
  a touch structure layer, the touch structure layer includes a plurality of touch electrodes;
  a pattern layer, the pattern layer is disposed on a light exiting side of the touch structure layer, and the pattern layer includes a plurality of minimum units; in an orthographic projection pattern of the touch screen, a region where one of the touch electrodes is located is correspondingly equipped with multiple minimum units of the plurality of minimum units arranged in an array, each of the plurality of minimum units includes at least two different types of feature bodies, and the at least two different types of feature bodies are arranged to form a first pattern;
  a controller, the controller is electrically connected to the plurality of touch electrodes; and
  the at least two different types of feature bodies of the pattern layer are configured to be identified by the active pen disposed externally, and the first pattern has a position information.

In another aspect, accordingly, an embodiment of the present disclosure further provides a touch method of a touch display device, the touch display device includes an active pen and a touch screen, the touch screen includes a touch structure layer and a pattern layer, the touch structure layer includes a plurality of touch electrodes, the pattern layer is disposed on the touch structure layer, and the pattern layer includes a plurality of minimum units; in an orthographic projection pattern of the touch screen, multiple minimum units of the plurality of minimum units arranged in an array are stacked on one of the touch electrodes, each of the plurality of minimum units includes at least two different types of feature bodies, and the at least two different types of feature bodies are arranged to form a first pattern;
  the touch method of the touch display device includes following operations:
  receiving a first coordinate information of a touch point of the active pen, the first coordinate information is obtained after the first pattern is identified and processed by the active pen disposed externally;
  obtaining a second coordinate information of the touch point of the active pen according to a touch signal of the active pen received by at least one of the touch electrodes;
  obtaining a real-time coordinate of the touch point of the active pen according to the first coordinate information and the second coordinate information.

DETAILED DESCRIPTION

Figure 1:
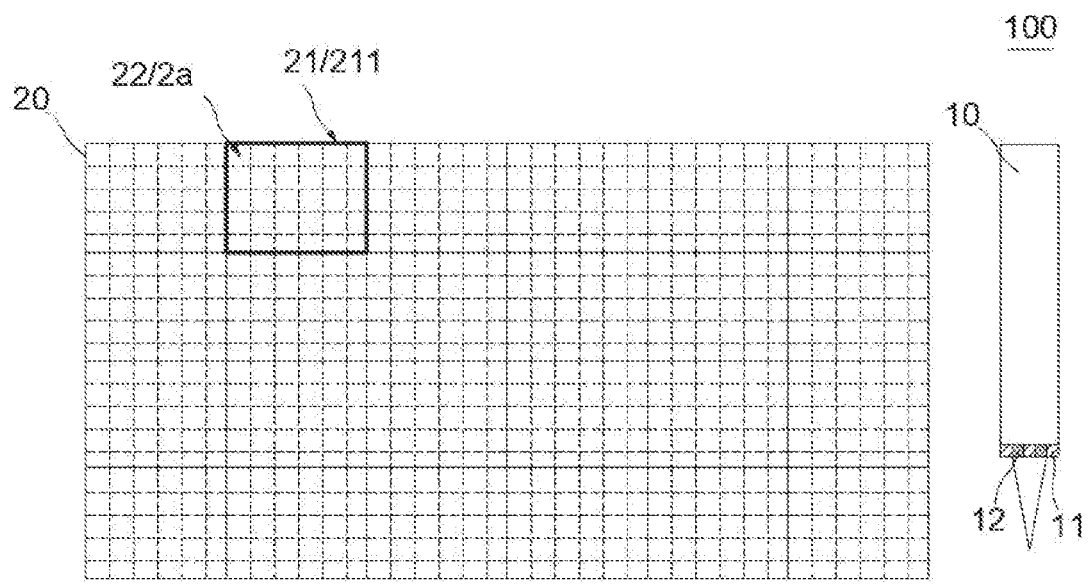
FIG. 1 is a schematic diagram of a structure of a touch display device equipped with an active pen disposed externally provided by an embodiment of the present disclosure.

Technical solutions in embodiments of the present disclosure will be clearly and completely described below with reference to the accompanying drawings in embodiments of the present disclosure. Apparently, embodiments described herein are only some of the embodiments of the present disclosure, rather than all of the embodiments of the present disclosure. Based on the embodiments of the present disclosure, all other embodiments obtained by those skilled in the art without making creative efforts fall within the protection scope of the present disclosure. In addition, it should be understood that specific embodiments described herein are only intended to illustrate and explain the present disclosure, and are not intended to limit the present disclosure. In this disclosure, unless otherwise specified, directional terms used herein, such as "upper" and "lower", generally refer to upper and lower positions of a device in actual use or working conditions, specifically refer to directions in the surfaces of the accompanying drawings. Terms "inside" and "outside" are for the contour of the device; and terms "first", "second", "third", and the like, are used merely as designators and do not impose numerical requirements or establish a sequence.

Embodiments of the present disclosure provide a touch display device and a touch method thereof, which will be described in detail below. It should be noted that the order of description of the following embodiments does not limit the preferred order of the embodiments.

An embodiment of the present disclosure provides a touch display device including an active pen and a touch screen, the touch screen includes:

a touch structure layer, the touch structure layer includes a plurality of touch electrodes;

a pattern layer, the pattern layer is disposed on a light exiting side of the touch structure layer, and the pattern layer includes a plurality of minimum units; in an orthographic projection pattern of the touch screen, a region where one of the touch electrodes is located is correspondingly equipped with multiple minimum units of the plurality of minimum units arranged in an array, each of the plurality of minimum units includes at least two different types of feature bodies, and the at least two different types of feature bodies are arranged to form a first pattern;

a controller, the controller is electrically connected to the plurality of touch electrodes;

the at least two different types of feature bodies of the pattern layer are configured to be identified by the active pen disposed externally, and the first pattern has a position information.

Optionally, in some embodiments of the present disclosure, during a touch phase of the active pen, the controller is configured to receive a first coordinate information obtained by the active pen after the active pen identifies the first pattern, and to obtain a second coordinate information of a touch point of the active pen according to a touch signal of the active pen received by at least one of the touch electrodes, and to obtain a real-time coordinate of the touch point of the active pen according to the first coordinate information and the second coordinate information.

Optionally, in some embodiments of the present disclosure, at least one type of the at least two different types of feature bodies is arranged along a circumferential direction of one of the plurality of minimum units to form a second pattern that is different from the first pattern, the second pattern is configured to define a range of the one of the plurality of minimum units, and the first pattern is disposed in a region surrounded by the second pattern.

Optionally, in some embodiments of the present disclosure, at least two feature bodies of the at least two different types of feature bodies are arranged to form a third pattern that is different from the second pattern, the third pattern is disposed in the region surrounded by the second pattern and located at one side of the first pattern, and the third pattern has the position information.

Optionally, in some embodiments of the present disclosure, any feature body of the at least two different types of feature bodies has a shape and a thickness, the shape is a shape of each feature body of the at least two different types of feature bodies in the orthographic projection pattern of the touch screen, and the thickness is a thickness value of each feature body of the at least two different types of feature bodies in an orthographic projection direction of the touch screen, and at least one of the shape and the thickness value is different among the at least two feature bodies of the at least two different types of feature bodies; and any one of the first pattern and the third pattern includes at least one of a pattern formed by arranging the at least two different types of feature bodies having different shapes and a pattern formed by arranging the at least two different types of feature bodies having different thicknesses.

Optionally, in some embodiments of the present disclosure, the pattern formed by arranging the at least two different types of feature bodies having different shapes is configured to be obtained by a camera and form an image, and the pattern formed by arranging the at least two different types of feature bodies having different thicknesses is configured to be obtained by an ultrasonic probe and form an image.

Optionally, in some embodiments of the present disclosure, each of the first pattern and the third pattern is a pattern formed by the at least two different types of feature bodies arranged in a number system, a number of types of the at least two different types of feature bodies is a radix, and one type of the at least two different types feature bodies serves as a digit.

Optionally, in some embodiments of the present disclosure, the number system is a binary system, the at least two different types of feature bodies include a first type of feature bodies and a second type of feature bodies, a shape of each of the first type of feature bodies is different from a shape of each of the second type of feature bodies, a thickness of each of the first type of feature bodies is different from a thickness of each of the second type of feature bodies, the first type of feature bodies serves as a digit 0, and the second type of feature bodies serves as a digit 1.

Optionally, in some embodiments of the present disclosure, the shape of any feature body of the at least two different types of feature bodies includes a circle, an ellipse and a polygon, and the thickness of each of the first type of feature bodies is half of the thickness of each of the second type of feature bodies.

Optionally, in some embodiments of the present disclosure, the touch screen includes a middle region and a marginal region located around the middle region, the at least two different types of feature bodies include first middle feature bodies, second middle feature bodies, first marginal feature bodies, and second marginal feature bodies, the first middle feature bodies and the second middle feature bodies are located in the middle region, and the first marginal feature bodies and the second marginal feature bodies are located in the marginal region; and a thickness of each of the second middle feature bodies is n times a thickness of each of the first middle feature bodies, a thickness of each of the second marginal feature bodies is n times a thickness of each of the first marginal feature bodies, the thickness of each of the second middle feature bodies is greater than the thickness of each of the second marginal feature bodies, and n is greater than 1.

Optionally, in some embodiments of the present disclosure, the second pattern is formed by a same type of the at least two different types of feature bodies arranged along the circumferential direction of one of the plurality of minimum units.

Optionally, in some embodiments of the present disclosure, the touch screen further includes a substrate, a black matrix layer and a color resistance layer, the black matrix layer is disposed on a side of the substrate away from a touch surface of the touch screen, a plurality of openings are opened on the black matrix layer, color resistors of the color resistance layer are disposed in the openings, the pattern layer is disposed between the substrate and the black matrix layer, in the orthographic projection pattern of the touch screen, the pattern layer and the black matrix layer are overlapped, and each feature body of the at least two different types of feature bodies is located on an outer periphery of each of the color resistors; and each of the substrate, the black matrix layer and the color resistance layer is located on the light exiting side of the touch structure layer.

Optionally, in some embodiments of the present disclosure, the touch screen further includes a color filter substrate and an array substrate disposed oppositely and spaced apart, the substrate, the black matrix layer, the color resistance layer and the pattern layer are integrated in the color filter substrate, and the touch structure layer is integrated in the array substrate.

Optionally, in some embodiments of the present disclosure, a thickness of the color resistance layer is greater than a sum of thicknesses of the black matrix layer and the pattern layer.

Optionally, in some embodiments of the present disclosure, the touch screen further includes a display panel, a polarizer and a cover plate that are stacked in sequence, and the pattern layer is disposed between the cover plate and the polarizer or at a side of the cover plate away from the polarizer.

Optionally, in some embodiments of the present disclosure, the display panel includes a color filter substrate and an array substrate arranged oppositely and spaced apart, the color filter substrate includes a substrate and a color filter layer, the color filter layer is disposed on a side of the substrate close to the array substrate, and the polarizer is disposed on a side of the substrate away from the array substrate; and a material of the pattern layer includes a transparent metal oxide, the display panel further includes a transparent common electrode layer configured to drive a liquid crystal to deflect, and the common electrode layer is disposed on a side of the color filter layer away from the pattern layer.

Optionally, in some embodiments of the present disclosure, the first coordinate information is $(x_1, y_1)$, the second coordinate information is $(x_2, y_2)$, and the real-time coordinate is $(x_0, y_0)$;

wherein the real-time coordinate $(x_0, y_0) = a(x_1, y_1) + b(x_2, y_2)$, $0 < a < 1$, $0 < b < 1$, and $a + b = 1$.

Optionally, in some embodiments of the present disclosure, $a > b$.

Accordingly, an embodiment of the present disclosure further provides a touch method of a touch display device, the touch display device includes an active pen and a touch screen, the touch screen includes a touch structure layer and a pattern layer, the touch structure layer includes a plurality of touch electrodes, the pattern layer is disposed on the touch structure layer, and the pattern layer includes a plurality of minimum units; in an orthographic projection pattern of the touch screen, multiple minimum units of the plurality of minimum units arranged in an array are stacked on one of the touch electrodes, each of the plurality of minimum units includes at least two different types of feature bodies, and the at least two different types of feature bodies are arranged to form a first pattern;

the touch method of the touch display device includes following operations:

receiving a first coordinate information of a touch point of an active pen, the first coordinate information is obtained after the first pattern is identified and processed by the active pen disposed externally;

obtaining a second coordinate information of the touch point of the active pen according to a touch signal of the active pen received by at least one of the touch electrodes;

obtaining a real-time coordinate of the touch point of the active pen according to the first coordinate information and the second coordinate information.

The touch display device according to the embodiment of the present disclosure is added with a pattern layer on the touch screen with a touch structure layer. The pattern layer is disposed on the touch structure layer, and the pattern layer includes a plurality of minimum units; in an orthographic projection pattern of the touch screen, multiple minimum units of the plurality of minimum units arranged in an array are stacked on one of the touch electrodes, each of the plurality of minimum units includes at least two different feature bodies, and the at least two different feature bodies are arranged to form a first pattern; a controller is electrically connected to the touch electrodes. During the touch phase of the active pen, the active pen is configured to obtain the image of the first pattern and obtain the first coordinate information of the touch point of the active pen according to the image of the first pattern, and the controller is configured to obtain the second coordinate information of the touch point of the active pen according to the touch signal of the active pen received by at least one of the touch electrodes, and obtain the real-time coordinate of the touch point of the active pen according to the first coordinate information and the second coordinate information.

The touch display device of the embodiments is added with a pattern layer having a plurality minimum units, multiple minimum units of the plurality of minimum units are correspondingly disposed on one of the touch electrodes. That is, the accuracy of the minimum unit is greater than the accuracy of the touch electrode. The active pen obtains the first coordinate information of the touch point of the active pen by acquiring the image of the first pattern in the minimum unit under the touch point, and uses the first coordinate information to correct the second coordinate information, thereby improving the touch accuracy of the touch point of the active pen.

Figure 2:
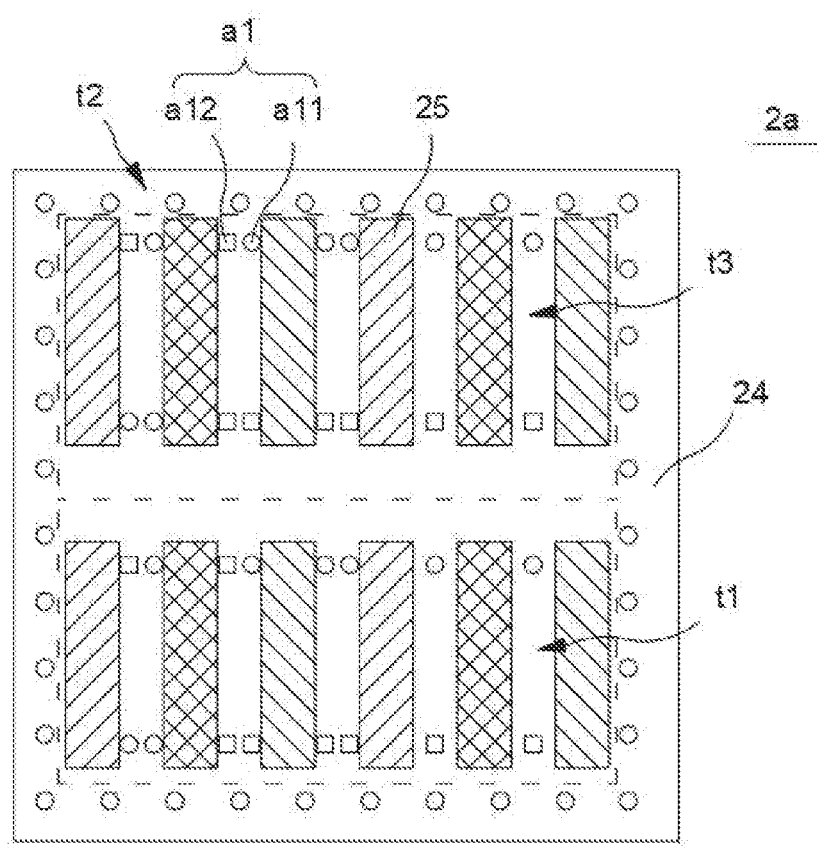
FIG. 2 is a schematic diagram of a structure of minimum units of a touch display device provided by an embodiment of the present disclosure.

Referring to FIG. 1 to FIG. 2, an embodiment of the present disclosure provides a touch display device 100 including a touch screen 20. The touch display device 100 is additionally equipped with an active pen 10 to facilitate the user to input information into the touch display device 100.

The touch screen 20 includes a touch structure layer 21, a pattern layer 22 and a controller (not shown in the figure). The touch structure layer 21 includes a plurality of touch electrodes 211. The pattern layer 22 is disposed on the light exiting side of the touch structure layer 21. The pattern layer 22 includes a plurality of minimum units 2a. In the orthographic projection pattern of the touch screen 20, a region where one of the touch electrodes 211 is located is correspondingly equipped with multiple minimum units 2a of the plurality of minimum units arranged in an array. Each of the plurality of minimum units 2a includes at least two different types of feature bodies a1. The at least two different types of feature bodies a1 are arranged to form a first pattern t1. The controller is electrically connected to the touch electrodes 211.

The at least two different types of feature bodies a1 of the pattern layer 22 are configured to be identified by the active pen 10 disposed externally. The first pattern t1 has a position information. That is to say, the active pen 10 has an identification module, and the identification module is used to identify the at least two different types of feature bodies a1.

During a touch phase of the active pen, the controller is configured to receive a first coordinate information obtained by the active pen 10 after the active pen 10 identifies the first pattern t1, and to obtain a second coordinate information of a touch point of the active pen 10 according to a touch signal of the active pen 10 received by at least one of the touch electrodes 211, and to obtain a real-time coordinate of the touch point of the active pen 10 according to the first coordinate information and the second coordinate information.

That is to say, during the touch phase of the active pen, the identification module of the active pen 10 is configured to obtain an image of the first pattern t1 and obtain the first coordinate information of the touch point of the active pen 10 according to the image of the first pattern t1. The controller is configured to obtain the second coordinate information of the touch point of the active pen 10 according to the touch signal of the active pen 10 received by at least one of the touch electrodes 211, and to obtain the real-time coordinate of the touch point of the active pen 10 according to the first coordinate information and the second coordinate information.

The touch display device 100 of the present embodiment is added with a pattern layer 22 with a plurality of minimum units 2a. Multiple minimum units 2a of the plurality of minimum units 2a are correspondingly disposed on at least one of the touch electrodes 211, that is, the accuracy of the minimum unit 2a is greater than the accuracy of the touch electrode 211. The active pen 10 obtains the image of the first pattern t1 in the minimum unit 2a under the touch point of the active pen 10, and then obtains the first coordinate information of the touch point of the active pen 10, and uses the first coordinate information to correct the second coordinate information, thereby improving the touch accuracy of the touch point of the active pen 10.

The pattern layer 22 may be not connected to a controller, that is, no additional circuit is needed, thereby saving costs.

Optionally, multiple minimum units 2a are correspondingly disposed on at least one of the touch electrodes. For example, the number of the touch electrodes 211 is 2400, which are arranged in a matrix of 60*40. The region where each touch electrode 211 is located can be provided with 864 minimum units, and 864 minimum units 2a are arranged in a matrix of 27*32.

Therefore, compared with the touch accuracy based merely on the touch electrode 211, the embodiment of the present disclosure is added with a pattern layer 22, and the accuracy of the minimum unit 2a is 864 times that of the touch electrode 211. Therefore, with the assistance of the minimum unit 2a, the touch accuracy of the touch point of the active pen 10 can be greatly improved.

In one embodiment, the region where one touch electrode 211 is located may also be provided with two or more (including two) minimum units 2a.

Optionally, the first patterns t1 in each minimum unit 2a are different, and one first pattern t1 represents a position coordinate. The active pen 10 acquires the image of a first pattern t1 and converts the image into a coordinate information after interpreting the image. Therefore, different first patterns t1 correspond to different coordinate information.

Optionally, in one embodiment, the first coordinate information is $(x_1, y_1)$, the second coordinate information is $(x_2, y_2)$, and the real-time coordinates are $(x_0, y_0)$.

The real-time coordinate $(x_0, y_0)=a\ (x_1, y_1)+b\ (x_2, y_2)$, $0<a<1$, $0<b<1$, and $a+b=1$.

It can be understood that the real-time coordinate of the touch point of the active pen 10 is adjusted using the ratio of the weight coefficients a and b, so that the real-time coordinate of the touch point of the active pen 10 has a higher accuracy. Since the weight coefficient a corresponds to the first coordinate information of the first pattern t1 in the minimum unit 2a, the greater the weight coefficient a, the higher the accuracy of the real-time coordinate of the touch point of the active pen 10 is. Therefore, if a>b, it can further improve the accuracy of the real-time coordinate of the touch point of the active pen 10.

Optionally, the touch screen 20 can be a liquid crystal display or an electroluminescent display, such as an organic light emitting diode (OLED) display, a micro light emitting diode display, or a sub-millimeter light emitting diode display.

The touch structure layer 21 can be attached to the display panel in an externally-mounted manner, or can be formed in the touch screen 20 in an integrated manner.

The controller can be directly bound to the display panel of the touch screen 20, or can be electrically connected to the display panel through a circuit board.

Optionally, the controller can be a touch chip or a control circuit.

Optionally, the pattern layer 22 is disposed on the light exiting side of the touch structure layer 21 to prevent the touch structure layer 21 from affecting the identification module's acquisition of the first pattern t1 in the pattern layer 22.

Optionally, in one embodiment, at least one type of the at least two different types of feature bodies a1 is arranged along the circumferential direction of one of the minimum units 2a to form a second pattern t2 that is different from the first pattern t1. The second pattern t2 is used to define the range of one of the minimum units 2a, and the first pattern t1 is disposed in the region surrounded by the second pattern t2.

The second pattern t2 is configured to define the range of the minimum unit 2a. That is to say, after the active pen 10 obtains the image of the second pattern t2, the active pen can identify and determine that the range limited by the second pattern t2 is a minimum unit 2a to avoid the problem of unclear identification.

Optionally, the second pattern t2 can be any pattern, as long as it is different from the first pattern t1.

Optionally, in one embodiment, at least two feature bodies a1 of the at least two types of feature bodies a1 are arranged to form a third pattern t3 that is different from the second pattern t2. The third pattern t3 is disposed in the region surrounded by the second pattern t2 and is located at one side of the first pattern t1, and the third pattern t3 has the position information.

In one embodiment, the third pattern t3 and the first pattern t1 have the same position information, that is, the identification module can obtain the same coordinate information by identifying the third pattern t3 or the first pattern t1. The third pattern t3 is equivalent to a backup of the position information of the first pattern t1.

When performing a touch test, in a case where the identification module cannot identify the first pattern t1 or there is a deviation in the identification of the first pattern t1, the correct position information can be obtained by identifying the third pattern t3, thereby reducing the risk of position coordinate deviation of the touch point of the active pen 10.

Optionally, in one embodiment, the first pattern t1 and the third pattern t3 may be the same pattern, that is, the shape arrangement and thickness arrangement thereof are same.

Optionally, in one embodiment, the first pattern t1 and the third pattern t3 may also be different patterns, that is, the shape arrangements of the first pattern t1 and the third pattern t3 are different, and/or, the thickness arrangements of the first pattern t1 and the third pattern t3 are different.

In addition, in one embodiment, the position information of a third pattern t3 corresponds to the position of a minimum unit 2a. During the touch test, when the touch point of the active pen 10 touches the touch screen 20, the active pen 10 will acquire the image of the pattern layer 22 in a region where the touch point is located in real time. After interpreting the image, the minimum unit 2a where the touch point is located can be determined through the second pattern t2. The position of the minimum unit 2a is locked based on the information corresponding to the third pattern t3 in the minimum unit 2a. If an abnormality of the touch point occurs, the abnormal position can be accurately found and repaired through the position information corresponding to the third pattern t3.

For example, after the image of the third pattern t3 is interpreted, the information obtained is the third row and the fourth column, then it can be determined that the abnormal point is located at the intersection of third row and the fourth column.

Optionally, the region surrounded by the second pattern t2 can be divided into two small regions, one small region is used to dispose the first pattern t1, and another small region is used to dispose the third pattern t3, so as to facilitate the distinction between the first pattern t1 and the third pattern t3.

In some embodiments, a first identification pattern is also used as the identification mark of the first pattern t1, and the second identification pattern is used as the identification mark of the third pattern t3. In this way, the first pattern t1 and the third pattern t3 can be distinguished by the first identification pattern and the second identification pattern, thereby avoiding identification errors.

For example, the first identification pattern segment can be n identical feature bodies a1 in succession, n is greater than 0, for example, three circles in succession. The second identification pattern segment can be m identical feature bodies a1 in succession, m is greater than 0, for example, three triangles in succession.

It should be understood that the feature body a1 refers to an object with a three-dimensional structure.

Optionally, any feature body a1 of the at least two different types of feature bodies a1 has a shape and a thickness, the shape is a shape of each feature body a1 of the feature bodies a1 in the orthographic projection pattern of the touch screen 20, and the thickness is a thickness value in the orthographic projection direction of the touch screen 20. At least one of the shape and the thickness value is different among the at least two feature bodies a1 of the at least two different types of feature bodies a1.

Each of the first pattern t1 and the third pattern t3 includes at least one of a pattern formed by arranging the at least two different types of feature bodies a1 having different shapes and a pattern formed by arranging the at least two different types of feature bodies a1 having different thicknesses. The second pattern t2 is formed by arranging at least one type of the at least two different types of feature bodies a1.

Correspondingly, the pattern formed by arranging the at least two different types of feature bodies a1 having different shapes is configured to be acquired by a camera and form an image. The pattern formed by arranging the at least two different types of feature bodies a1 having different thicknesses is configured to be acquired by an ultrasonic probe and form an image.

Optionally, the identification module of the active pen 10 includes at least one of a camera 11 and an ultrasonic probe 12. The camera 11 is configured to acquire the image of the pattern formed by arranging at least two different types of feature bodies having different shapes. The ultrasonic probe 12 is configured to acquire the image of the pattern formed by arranging at least two different types of feature bodies having different thicknesses.

It should be understood that for the same first pattern t1 or second pattern t2, the image acquired by the camera 11 is different from the image acquired by the ultrasonic probe 12, but the same information can be obtained after interpretation of the two images.

In other words, the present disclosure can use either of the two image acquisition methods to realize the interpretation of the information of the pattern.

In one embodiment, the active pen 10 can simultaneously acquire images of the pattern layer 22 using the above two image acquisition methods, so as to improve the accuracy of the first coordinate information.

It should be understood that when determining the coordinate information, it is required that the active pen 10 is used to perform multiple times of image acquisition for a same minimum unit 2a, and to obtain multiple coordinate information based on multiple times of image interpretation, so that the coordinate information with the highest accuracy can be obtained based on the multiple coordinate information. For example, the average value of multiple coordinate information is selected as the first coordinate information of the minimum unit 2a. If two image acquisition methods are used to acquire the images simultaneously, two coordinate information can be obtained at one time. Therefore, in a case where the number of times of image acquisition are same, the first coordinate information of the minimum unit 2a obtained by using the camera 11 and the ultrasonic probe 12 at the same time is more accurate.

Optionally, the camera 11 can be an infrared camera.

Optionally, in one embodiment, each of the first pattern t1 and the third pattern t3 is a pattern formed by at least two different types of feature bodies a1 arranged in a number system. The number of types of the at least two different types of feature bodies a1 is the radix, and one type of the at least two different types of feature bodies a1 serves as a digit.

The number system method is a relatively simple method, which is convenient for simplifying the pattern. Apparently, in some embodiments, other arranging methods can also be used, as long as the coordinate information can be correspondingly obtained.

Optionally, each of the first pattern t1 and the third pattern t3 has at least two rows. The sub-pattern arranged through at least one row of the at least two rows of feature bodies a1 can be identified and interpreted as the abscissa, and the sub-pattern arranged through the other at least one row of the at least two rows of feature bodies a1 can be identified and interpreted as the ordinate.

For example, the first pattern t1 has four rows of feature bodies, the sub-pattern arranged through the first row and second row of feature bodies corresponds to an abscissa value, and the sub-pattern arranged through the third row and fourth row of feature bodies corresponds to an ordinate value.

The number of feature bodies a1 can be adjusted according to the actual situation. For example, an abscissa/ordinate value can correspond to 4 bits, 6 bits, 8 bits, 10 bits, 12 bits, 14 bits or 16 bits, or the like.

Optionally, in one embodiment, the number system is binary system. At least two different types of feature bodies a1 include a first type of feature bodies a11 and a second type of feature bodies a12. The shape of each of the first type of feature bodies a11 is different from the shape of each of the second type of feature bodies a12. The thickness of each of the first type of feature bodies a11 is different from the thickness of each of the second type of feature bodies a12. The first type of feature bodies a11 serves as digit 0. The second type of feature bodies a12 serves as digit 1.

That is to say, each of the first pattern t1 and the third pattern t3 is formed by arranging two different types of feature bodies a1 (i.e., the first type of feature bodies a11 and the second type of feature bodies a12).

By using the binary system, it is convenient for the formation of the first pattern t1 and third pattern t3 that are simple, so as to avoid the pattern from being complex, and improve identification efficiency.

In some embodiments, the first pattern t1 and the third pattern t3 can use same number system, or can use different number systems. For example, the first pattern t1 and the third pattern t3 can each adopt one of the ternary system, quaternary system, senary system, octal system, decimal system, or the like.

Optionally, the shape of each feature body a1 of the at least two different types of feature bodies a1 includes but is not limited to circle, ellipse and polygon. The thickness of each of the first type of feature bodies a11 is half of the thickness of each of the second type of feature bodies a12.

For example, the shape of each of the first type of feature bodies a11 is a circle, and the thickness thereof is h/2. The shape of each of the second type of feature bodies a12 is a square, and the thickness thereof is h. Then, the first type of feature bodies a11, which is in a shape of circle and has a thickness of h/2, represents "0" in the binary system, and the second type of feature bodies a12, which is in a shape of square and has a thickness of h, represents "1" in the binary system. Therefore, coordinate information can be obtained by identifying and interpreting the binary code.

Optionally, in one embodiment, the second pattern t2 is formed by the same type of feature bodies a1 arranged along the circumferential direction of the minimum unit 2a. Such configuration can simplify the second pattern t2 and improve the identification effect.

For example, the second pattern t2 may be formed by the first type of feature bodies a11 having the shape of circle arranged in a round.

Figure 3:
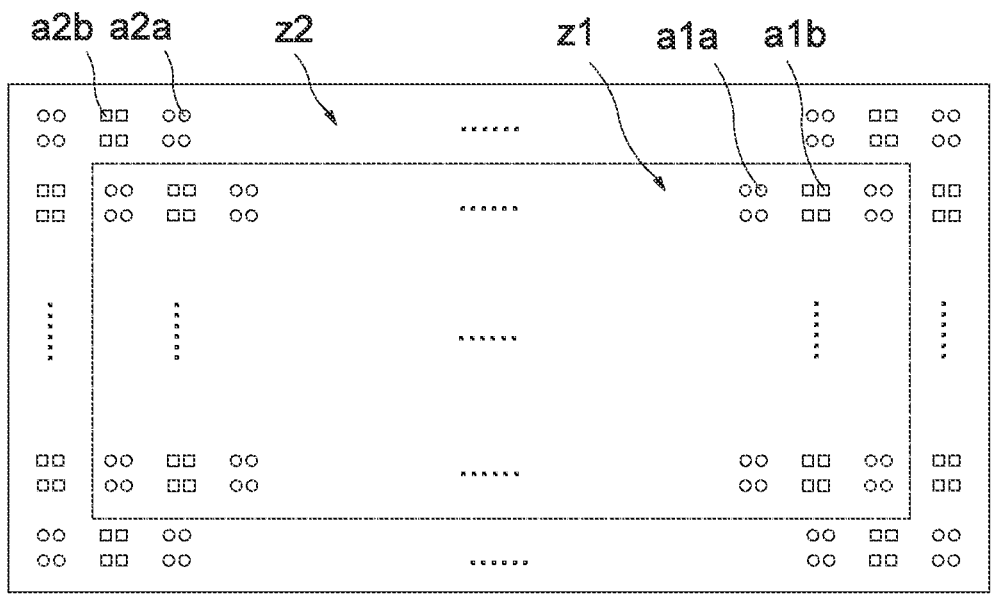
FIG. 3 is a schematic diagram of a top view structure of a touch screen of a touch display device provided by an embodiment of the present disclosure.

Optionally, referring to FIG. 3, in one embodiment, the touch screen 20 includes a middle region z1 and a marginal region z2 located around the middle region z1. The at least two different types of feature bodies a1 include first middle feature bodies a1a, second middle feature bodies a1b, first marginal feature bodies a2a and second marginal feature bodies a2b. The first middle feature bodies a1a and the second middle feature bodies a1b are located in the middle region z1. The first marginal feature bodies a2a and the second marginal feature bodies a2b are located in the marginal region z2.

The thickness of each of the second middle feature bodies a1b is n times the thickness of each of the first middle feature bodies a1a. The thickness of each of the second marginal feature bodies a2b is n times the thickness of each of the first marginal feature bodies a2a. The thickness of each of the second middle feature bodies a1b is greater than the thickness of each of the second marginal feature bodies a2b, and n is greater than 1. For example, n can be 2, 2.5, 3, 3.5, 4, 4.5, 5, 6, or the like.

It can be understood that in the touch screen 20, the middle region z1 of the touch screen 20 is touched more frequently than the marginal region z1, and generally, the force applied to the middle region z1 is greater than the force applied to the marginal region z2 when a user performs a touch operation. Therefore, compared with the middle region z1, feature bodies a1 having smaller thickness are provided in the marginal region z2, which can make the touch efficiency of the marginal region z2 tend to be the same with that of the middle region z1, and make the support and stress resistance performance of the entire touch screen 20 against the active pen 10 tend to be uniform.

Optionally, the thickness of each of the second middle feature bodies a1b is n times the thickness of each of the second marginal feature bodies a2b. That is, the thickness of each of the first middle feature bodies a1a and the thickness of each of the second marginal feature bodies a2b are the same, which can simplify the manufacturing process.

Figure 4:
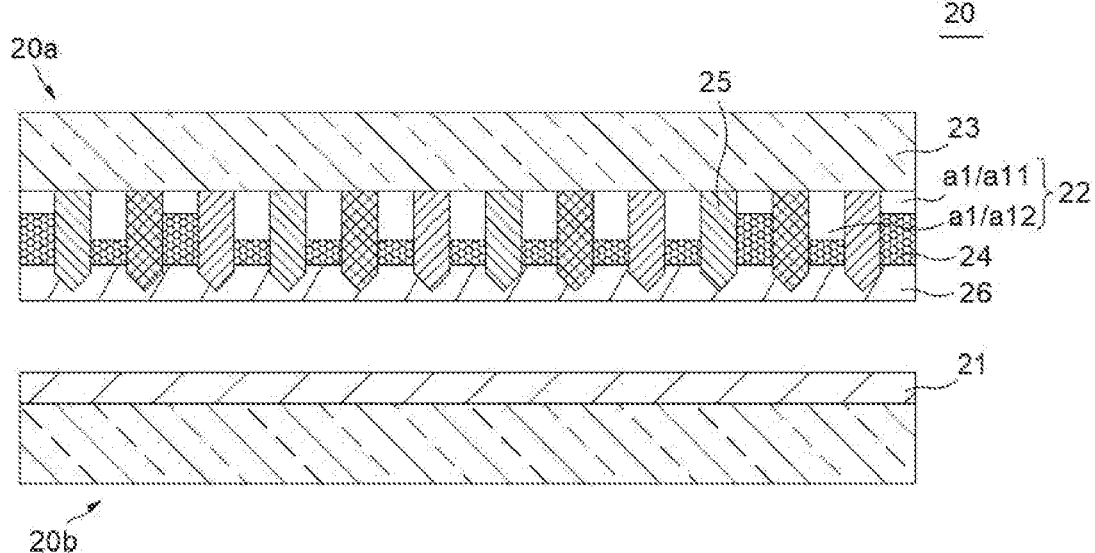
FIG. 4 is a schematic diagram of a structure of a touch screen of a touch display device provided by an embodiment of the present disclosure.

Referring to FIG. 4, optionally, in one embodiment, the touch screen 20 further includes a substrate 23, a black matrix layer 24 and a color resistance layer 25. The black matrix layer 24 is disposed on the side of the substrate 23 away from the touch surface of the touch screen 20. A plurality of openings kl are opened on the black matrix layer 24. Color resistors of the color resistance layer 25 are disposed in the openings kl. The pattern layer 22 is disposed between the substrate 23 and the black matrix layer 24. In the orthographic projection pattern of the touch screen 20, the pattern layer 22 and the black matrix layer 24 are overlapped, and each of the feature bodies a1 is located on the outer periphery of each of the color resistors.

The substrate 23 is located on the side close to the operation surface of a user.

The pattern layer 22 is stacked on the black matrix layer 24, so that the influence of the pattern layer 22 on the light emission can be avoided, thereby avoiding light loss, and without affecting the aperture ratio of the touch screen 20.

Optionally, the color resistors include red color resistors, blue color resistors and green color resistors.

Optionally, the touch screen 20 is a liquid crystal screen, and then the touch screen 20 includes a color filter substrate 20a and an array substrate 20b disposed oppositely and spaced apart. The substrate 23, the black matrix layer 24, the color resistance layer 25 and the pattern layer 22 are integrated in the color filter substrate 20a. The touch structure layer 21 is integrated in the array substrate 20b or on the side of the color filter substrate 20a close to the array substrate 20b.

Optionally, the thickness of the color resistance layer 25 is greater than the sum of the thicknesses of the black matrix layer 24 and the pattern layer 22. The thickness of the color resistance layer 25 is relatively large, which can improve the color purity of the emitted light of the touch screen 20 and reduce the risk of stray light interference.

Optionally, the material of the black matrix layer 24 has leveling properties. Since the feature bodies a1 have different thicknesses, the black matrix layer 24 also has different thicknesses in regions corresponding to the feature bodies a1 having different thicknesses.

The black matrix layer 24 is formed of a material having leveling properties, so that the black matrix layer 24 wraps the pattern layer 22, which reduces the risk of the black matrix layer 24 being easily broken due to the existence of feature bodies a1 having height differences.

In addition, when the material of the pattern layer 22 is a transparent metal oxide, the pattern layer 22 is stacked on the black matrix layer 24, so that the distances between the pattern layer 22 and the common electrode layer and the pixel electrode of the touch screen 20 are respectively relatively large, so as to avoid the interference of the common electrode layer and the pixel electrode on the pattern layer 22, and further improve the accuracy and clarity of the image of the pattern layer 22 acquired by the active pen 10.

Optionally, the color filter substrate 20a further includes a planarization layer 26 covering the color resistance layer 25 and the black matrix layer 24.

In another embodiment, the touch screen 20 is an OLED display. The touch structure layer 21 is formed on an encapsulation layer. The color resistance layer 25 and the black matrix layer 24 are formed on the touch structure layer 21. The substrate 23 is a cover plate.

It can be understood that by integrating the pattern layer 22 in the touch screen 20, the touch screen 20 can be made thinner, and the accuracy of forming the pattern layer 22 is much higher compared with the externally-mounted and attaching method.

Optionally, the material of the pattern layer 22 may be a transparent or opaque material, such as indium tin oxide, photoresist material, or the like. Furthermore, since the pattern layer 22 is formed on the black matrix layer 24, the material of the pattern layer 22 is a white material, such as a photoresist material, which can facilitate identification of the shape of the feature bodies a1.

Figure 5:
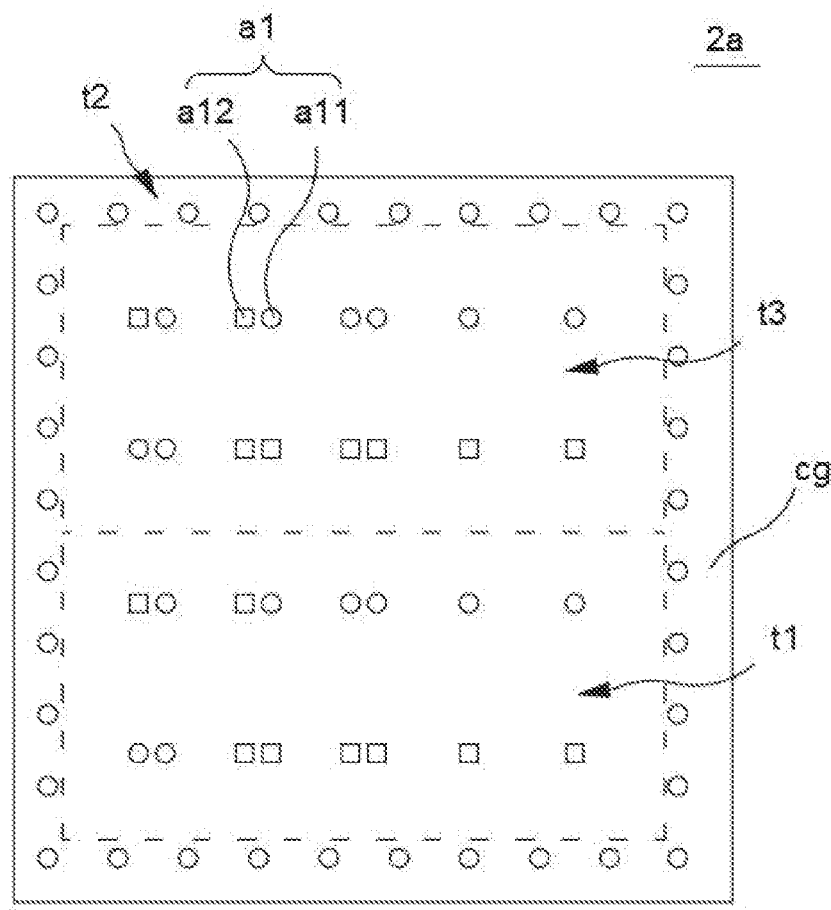
FIG. 5 is a schematic diagram of another structure of minimum units of a touch display device provided by the embodiment of the present disclosure.
Figure 6:
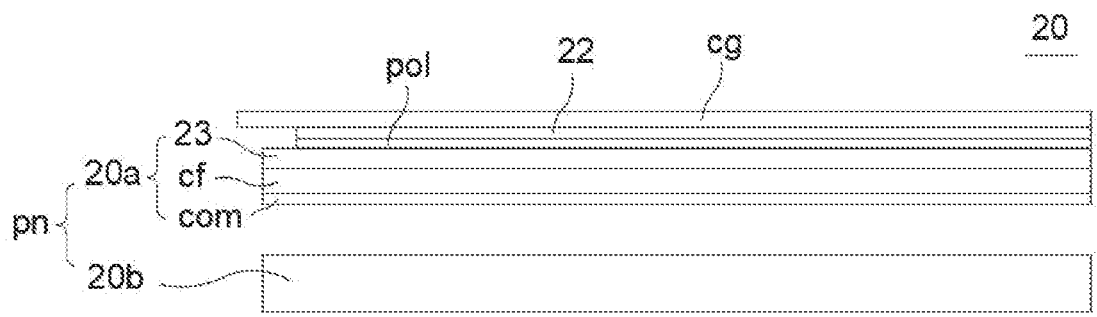
FIG. 6 is a schematic diagram of another structure of a touch screen of a touch display device provided by an embodiment of the present disclosure.

Referring to FIG. 5 and FIG. 6, in one embodiment of the present disclosure, the touch screen 20 also includes a display panel pn, a polarizer pol and a cover plate cg that are stacked in sequence. The pattern layer 22 is disposed between the cover plate cg and the polarizer pol.

Figure 7:
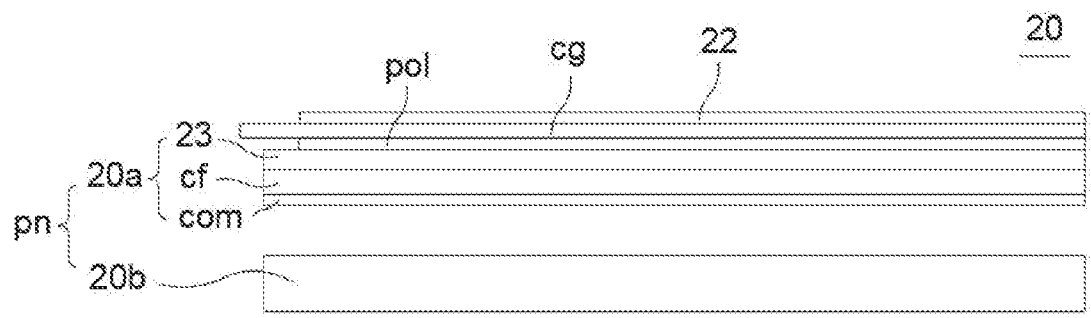
FIG. 7 is a schematic diagram of yet another structure of a touch screen of a touch display device provided by an embodiment of the present disclosure.

In one embodiment, as shown in FIG. 7, the pattern layer 22 is disposed on the side of the cover plate cg away from the polarizer pol.

The touch structure layer 21 is integrated in the display panel pn. The pattern layer 22 can be formed on the cover plate cg or the polarizer pol.

Optionally, the material of the pattern layer 22 is a transparent material, such as indium tin oxide and photoresist material, or the like. Such configuration prevents the touch screen 20 from having a low light extraction rate.

Optionally, the pattern layer 22 is disposed between the cover plate cg and the polarizer pol or on the side of the cover plate cg away from the polarizer pol, so that the pattern layer 22 is closer to the touch surface of the touch screen 20, therefore, the pattern layer 22 is more easily acquired by the active pen 10, and a clearer image can be obtained.

Optionally, in one embodiment, the display panel pn includes a color filter substrate 20a and an array substrate 20b arranged oppositely and spaced apart. The color filter substrate 20a includes a substrate 23 and a color filter layer cf. The color filter layer cf is disposed on a side of the substrate 23 close to the array substrate 20b. The polarizer pol is disposed on the side of the substrate 23 away from the array substrate 20b.

The material of the pattern layer 22 includes transparent metal oxide. The display panel pn further includes a transparent common electrode layer com configured to drive the liquid crystal to deflect. The common electrode layer com is disposed on the side of the color filter layer cf away from the pattern layer 22.

The transparent metal oxide includes indium tin oxide, indium zinc oxide or other metal oxides. It can be understood that the transparent metal oxide, especially indium tin oxide, has better reflection effects on infrared light, so as to facilitate the active pen 10 to obtain a clearer image.

In addition, the common electrode layer com is disposed on the side of the color filter layer cf away from the pattern layer 22, so that the distance between the pattern layer 22 and the common electrode layer com, and that between the pattern layer 22 and the pixel electrode are respectively relatively large, thereby reducing the interference of the common electrode layer com and the pixel electrode on the pattern layer 22, and further improving the accuracy and clarity of the image of the pattern layer 22 acquired by the active pen 10.

Optionally, the common electrode layer com can be integrated on the side of the color filter substrate 20a or the side of the array substrate 20b.

Optionally, the feature bodies a1 in the pattern layer 22 can be reused as an optical microstructure to exert a light condensing effect, so as to improve the brightness of the light emitted in the front viewing angle of the display panel pn.

Figure 8:
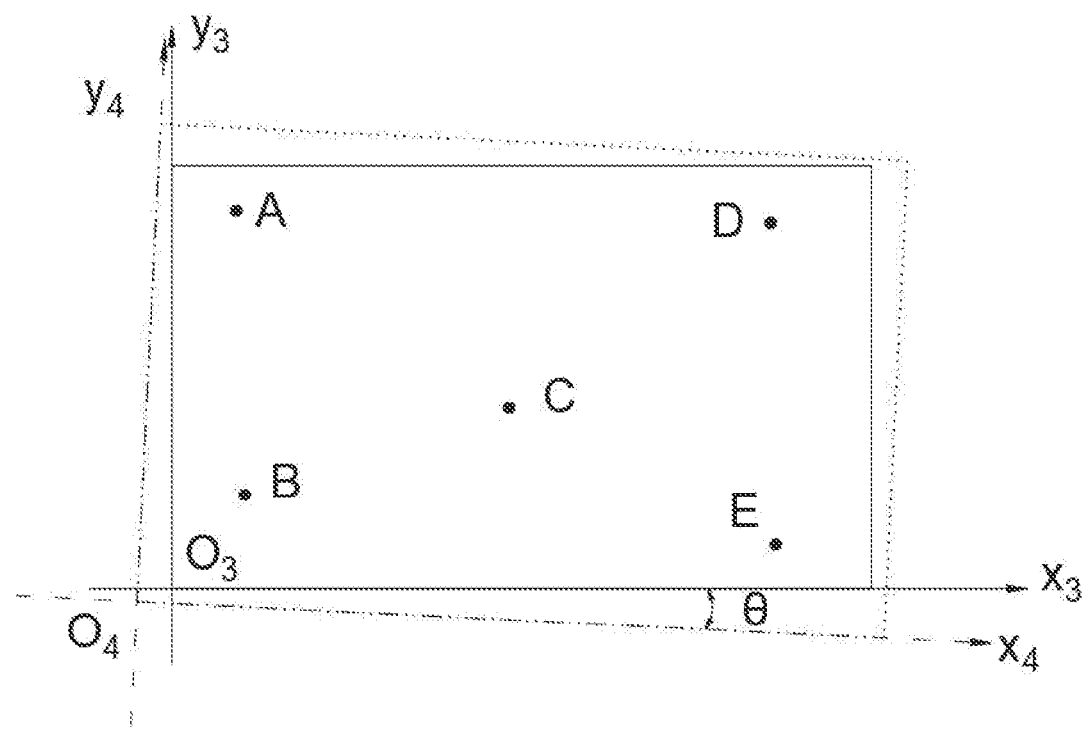
FIG. 8 is a schematic diagram of deviation between coordinate systems of a pattern layer and a pixel layer provided by an embodiment of the present disclosure.

In addition, due to the attachment accuracy of the cover plate cg/polarizer pol, the pattern layer 22 may be deviated from the position of the pixels, as shown in FIG. 8. The present disclosure uses image calibration to correct this deviation. As shown in FIG. 8, the coordinate system on the cover plate cg/polarizer pol is ($x_3$, $y_3$), and the pixel coordinate system is ($x_4$, $y_4$). After finishing the production of the module, pictures are taken with a high-precision camera, and V points on the panel are selected, in which V is greater than 1, and then the coordinate values of each point in the two coordinate systems are obtained. Taking point A as an example, the coordinates of A in the two coordinate systems are ($x_a$, $y_a$) and ($x_{a4}$, $y_{a4}$), respectively.

$$x_{a3} = x_{a4} * (1 - \cos\theta); y_{a3} = y_{a4} * (1 - \sin\theta).$$

$$\text{Therefore, } \sin\theta = (y_{a3} - y_{a4})/\sqrt{(x_{a3} - x_{a4})^2 + (y_{a3} - y_{a4})^2}.$$

$$\cos\theta = (x_{a3} - x_{a4})/\sqrt{(x_{a3} - x_{a4})^2 + (y_{a3} - y_{a4})^2}.$$

The values of $\cos\theta$ and $\sin\theta$ corresponding to each of the V points can be acquired respectively, and the average value of values of $\cos\theta$ and $\sin\theta$ can be calculated, and the average value of values of $\cos\theta$ and $\sin\theta$ can be used as the correction coefficient. When the active pen 10 obtains the coordinate information of the pattern layer 22, the first coordinate information which is more accurate can be obtained by combining the correction coefficient.

Optionally, the correction coefficient value can be stored in the controller or in other devices.

Correspondingly, an embodiment of the present disclosure further provides a touch method of a touch display device, the touch display device 100 includes a touch screen 20. The touch screen 20 includes a touch structure layer 21 and a pattern layer 22. The touch structure layer 21 includes a plurality of touch electrodes 211. The pattern layer 22 is disposed on the touch structure layer 21. The pattern layer 22 includes a plurality of minimum units 2a. In the orthographic projection pattern of the touch screen 20, multiple minimum units 2a of the plurality of minimum units 2a arranged in an array are stacked on one of the touch electrodes 211. Each of the plurality of minimum units 2a includes at least two different types of feature bodies a1, and the at least two different types of feature bodies a1 are arranged to form a first pattern t1.

The structure of the touch display device of the present embodiment is similar or identical to the structure of the touch display device 100 described in the above embodiments, and therefore will not be described again herein.

The touch method of the touch display device includes the following steps.

At step B1, receiving a first coordinate information of a touch point of an active pen, the first coordinate information is obtained after the first pattern t1 is identified and processed by the active pen 10 disposed externally;

at step B2, obtaining a second coordinate information of the touch point of the active pen 10 according to a touch signal of the active pen 10 received by at least one of the touch electrodes 211;

at step B3: obtaining a real-time coordinate of the touch point of the active pen according to the first coordinate information and the second coordinate information.

The touch method of the present embodiment is based on that the touch display device is added with a pattern layer having a plurality minimum units, multiple minimum units of the plurality of minimum units are correspondingly disposed on one of the touch electrodes. That is, the accuracy of the minimum unit is greater than the accuracy of the touch electrode. The active pen acquires the image of the minimum unit under the touch point, then obtains the first coordinate information of the touch point of the active pen, and uses the first coordinate information to correct the second coordinate information, thereby improving the touch accuracy of the touch point of the active pen.

At step B1, the first coordinate information of the touch point of the active pen is received, and the first coordinate information is obtained after the first pattern t1 is identified and processed by the active pen 10 disposed externally.

That is to say, the identification module of the active pen 10 acquires the image of the first pattern t1 and obtains the first coordinate information of the touch point of the active pen 10 according to the image of the first pattern t1, and transmits the first coordinate information to the touch screen 20.

The active pen 10 acquires the image of the first pattern t1 in the minimum unit 2a of the region where the touch point is located through the camera 11 and/or the ultrasonic probe 12. The image of the first pattern t1 is set as the first image. Based on the acquired first image, obtaining the first coordinate information by identifying and interpreting the first image; and transmitting the first coordinate information to a processing unit of the controller.

At step B2, a second coordinate information of the touch point of the active pen 10 is obtained according to the touch signal of the active pen 10 received by one of the touch electrodes 211, and the second coordinate information is transmitted to the processing unit of the controller.

At step B3, the real-time coordinate of the touch point of the active pen 10 is obtained according to the first coordinate information and the second coordinate information.

The processing unit of the controller obtains the real-time coordinate of the active pen when touching based on the real-time coordinate $(x_0, y_0)$=a $(x_1, y_1)$+b $(x_2, y_2)$ and combining the first coordinate information and the second coordinate information.

The touch display device and the touch method thereof provided by the embodiments of the present disclosure are described in detail in the above. Specific examples are used herein to illustrate the principles and implementations of the present disclosure. The description of the above embodiments is only intended to help to understand the method and core ideas of the present disclosure. At the same time, for those skilled in the art, there will be changes in specific implementations and application scope based on the ideas of the present disclosure. In summary, the content of this description should not be understood as a limitation of the present disclosure.

What is claimed is:

1. A touch display device comprising a touch screen, wherein the touch screen comprises:
    a touch structure layer, wherein the touch structure layer comprises a plurality of touch electrodes;
    a pattern layer, wherein the pattern layer is disposed on a light exiting side of the touch structure layer, and the pattern layer comprises a plurality of minimum units; in an orthographic projection pattern of the touch screen, a region where one of the touch electrodes is located is correspondingly equipped with multiple minimum units of the plurality of minimum units arranged in an array, each of the plurality of minimum units comprises at least two different types of feature bodies, and the at least two different types of feature bodies are arranged to form a first pattern; the feature bodies each refer to an object with a three-dimensional structure;
    a control circuit, wherein the control circuit is electrically connected to the plurality of touch electrodes; and
    wherein the at least two different types of feature bodies of the pattern layer are configured to be identified by an active pen disposed externally, and the first pattern has position information that corresponds to a position of a minimum unit of the plurality of minimum units.

2. The touch display device according to claim 1, wherein during a touch phase of the active pen, the control circuit is configured to receive a first coordinate information obtained by the active pen after the active pen identifies the first pattern, and to obtain a second coordinate information of a touch point of the active pen according to a touch signal of the active pen received by at least one of the touch electrodes, and to obtain a real-time coordinate of the touch point of the active pen according to the first coordinate information and the second coordinate information.

3. The touch display device according to claim 1, wherein at least one type of the at least two different types of feature bodies is arranged along a circumferential direction of one of the plurality of minimum units to form a second pattern that is different from the first pattern, the second pattern is configured to define a range of the one of the plurality of minimum units, and the first pattern is disposed in a region surrounded by the second pattern.

4. The touch display device according to claim 3, wherein at least two feature bodies of the at least two different types of feature bodies are arranged to form a third pattern that is different from the second pattern, the third pattern is disposed in the region surrounded by the second pattern and located at one side of the first pattern, and the third pattern has the position information.

5. The touch display device according to claim 4, wherein any feature body of the at least two different types of feature bodies has a shape and a thickness, the shape is a shape of each feature body of the at least two different types of feature bodies in the orthographic projection pattern of the touch screen, and the thickness is a thickness value of each feature body of the at least two different types of feature bodies in an orthographic projection direction of the touch screen, and wherein at least one of the shape and the thickness value is different among the at least two feature bodies of the at least two different types of feature bodies; and any one of the first pattern and the third pattern comprises at least one of a pattern formed by arranging the at least two different types of feature bodies having different shapes and a pattern formed by arranging the at least two different types of feature bodies having different thicknesses.

6. The touch display device according to claim 5, wherein the pattern formed by arranging the at least two different types of feature bodies having different shapes is configured to be acquired by a camera and form an image, and the pattern formed by arranging the at least two different types of feature bodies having different thicknesses is configured to be acquired by an ultrasonic probe and form an image.

7. The touch display device according to claim 5, wherein each of the first pattern and the third pattern is a pattern formed by the at least two different types of feature bodies arranged in a number system, a number of types of the at least two different types of feature bodies is a radix, and one type of the at least two different types feature bodies serves as a digit.

8. The touch display device according to claim 7, wherein the number system is a binary system, the at least two different types of feature bodies comprise a first type of feature bodies and a second type of feature bodies, a shape of each of the first type of feature bodies is different from a shape of each of the second type of feature bodies, a thickness of each of the first type of feature bodies is different from a thickness of each of the second type of feature bodies, the first type of feature bodies serves as a digit 0, and the second type of feature bodies serves as a digit 1.

9. The touch display device according to claim 8, wherein the shape of any feature body of the at least two different types of feature bodies comprises a circle, an ellipse and a polygon, and the thickness of each of the first type of feature bodies is half of the thickness of each of the second type of feature bodies.

10. The touch display device according to claim 5, wherein the touch screen comprises a middle region and a marginal region located around the middle region, the at least two different types of feature bodies comprise first middle feature bodies, second middle feature bodies, first marginal feature bodies, and second marginal feature bodies, the first middle feature bodies and the second middle feature bodies are located in the middle region, and the first marginal feature bodies and the second marginal feature bodies are located in the marginal region; and a thickness of each of the second middle feature bodies is n times a thickness of each of the first middle feature bodies, a thickness of each of the second marginal feature bodies is n times a thickness of each of the first marginal feature bodies, the thickness of each of the second middle feature bodies is greater than the thickness of each of the second marginal feature bodies, and n is greater than 1.

11. The touch display device according to claim 5, wherein the second pattern is formed by a same type of the at least two different types of feature bodies arranged along the circumferential direction of one of the plurality of minimum units.

12. The touch display device according to claim 1, wherein the touch screen further comprises a substrate, a black matrix layer and a color resistance layer, the black matrix layer is disposed on a side of the substrate away from a touch surface of the touch screen, a plurality of openings are opened on the black matrix layer, color resistors of the color resistance layer are disposed in the openings, the pattern layer is disposed between the substrate and the black matrix layer, in the orthographic projection pattern of the touch screen, the pattern layer and the black matrix layer are overlapped, and each of the at least two different types of feature bodies is located on an outer periphery of each of the color resistors; and each of the substrate, the black matrix layer and the color resistance layer is located on the light exiting side of the touch structure layer.

13. The touch display device according to claim 12, wherein the touch screen further comprises a color filter substrate and an array substrate disposed oppositely and spaced apart, the substrate, the black matrix layer, the color resistance layer and the pattern layer are integrated in the color filter substrate, and the touch structure layer is integrated in the array substrate.

14. The touch display device according to claim 13, wherein a thickness of the color resistance layer is greater than a sum of thicknesses of the black matrix layer and the pattern layer.

15. The touch display device according to claim 1, wherein the touch screen further comprises a display panel, a polarizer and a cover plate that are stacked in sequence, and the pattern layer is disposed between the cover plate and the polarizer or on a side of the cover plate away from the polarizer.

16. The touch display device according to claim 15, wherein the display panel comprises a color filter substrate and an array substrate arranged oppositely and spaced apart, the color filter substrate comprises a substrate and a color filter layer, the color filter layer is disposed on a side of the substrate close to the array substrate, and the polarizer is disposed on a side of the substrate away from the array substrate; and a material of the pattern layer comprises a transparent metal oxide, the display panel further comprises a transparent common electrode layer configured to drive a liquid crystal to deflect, and the common electrode layer is disposed on a side of the color filter layer away from the pattern layer.

17. The touch display device according to claim 15, wherein the first coordinate information is $(x_1, y_1)$, the second coordinate information is $(x_2, y_2)$, and the real-time coordinate is $(x_0, y_0)$;

wherein the real-time coordinate $(x_0, y_0)=a\,(x_1, y_1)+b\,(x_2, y_2)$, $0<a<1$, $0<b<1$, and $a+b=1$.

18. The touch display device according to claim 15, wherein $a>b$.

19. A touch method of a touch display device, wherein the touch display device comprises a touch screen, the touch screen comprises a touch structure layer and a pattern layer, the touch structure layer comprises a plurality of touch electrodes, the pattern layer is disposed on the touch structure layer, and the pattern layer comprises a plurality of minimum units; in an orthographic projection pattern of the touch screen, multiple minimum units of the plurality of minimum units arranged in an array are stacked on one of the touch electrodes, each of the plurality of minimum units comprises at least two different types of feature bodies, and the at least two different types of feature bodies are arranged to form a first pattern wherein the feature bodies each refer to an object with a three-dimensional structure;

wherein the touch method of the touch display device comprises following operations: receiving a first coordinate information of a touch point of an active pen, wherein the first coordinate information is obtained after the first pattern is identified and processed by the active pen disposed externally;

obtaining a second coordinate information of the touch point of the active pen according to a touch signal of the active pen received by at least one of the touch electrodes;

obtaining a real-time coordinate of the touch point of the active pen according to the first coordinate information and the second coordinate information.

20. The touch method of a touch display device according to claim 19, wherein at least one type of the at least two different types of feature bodies is arranged along a circumferential direction of one of the plurality of minimum units to form a second pattern that is different from the first pattern, the second pattern is configured to define a range of the one of the plurality of minimum units, and the first pattern is disposed in a region surrounded by the second pattern.

* * * * *